United States Patent
Suzuki

(10) Patent No.: US 9,120,420 B2
(45) Date of Patent: *Sep. 1, 2015

(54) SWIVEL-MOUNTED VEHICLE HEADLAMP WITH MULTIFUNCTIONAL LIGHT DISTRIBUTION PATTERNS

(71) Applicant: ICHIKOH INDUSTRIES, LTD., Isehara-shi, Kanagawa-ken (JP)

(72) Inventor: Yasufumi Suzuki, Isehara (JP)

(73) Assignee: ICHIKOH INDUSTRIES, LTD., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/754,328

(22) Filed: Jan. 30, 2013

(65) Prior Publication Data

US 2013/0204498 A1 Aug. 8, 2013

(30) Foreign Application Priority Data

Feb. 2, 2012 (JP) ................. 2012-020870

(51) Int. Cl.
| | |
|---|---|
| *B60Q 1/00* | (2006.01) |
| *B60Q 1/04* | (2006.01) |
| *B60Q 1/08* | (2006.01) |
| *B60Q 1/24* | (2006.01) |
| *F21S 8/10* | (2006.01) |
| *B60Q 1/076* | (2006.01) |

(52) U.S. Cl.
CPC ........... *B60Q 1/04* (2013.01); *B60Q 1/076* (2013.01); *B60Q 1/085* (2013.01); *B60Q 1/24* (2013.01); *F21S 48/1159* (2013.01); *F21S 48/1388* (2013.01); *F21S 48/1742* (2013.01); *F21S 48/1757* (2013.01); *B60Q 2300/056* (2013.01); *B60Q 2300/41* (2013.01); *B60Q 2300/42* (2013.01)

(58) Field of Classification Search
CPC .......... B60Q 1/04; B60Q 1/0425; B60Q 1/06; B60Q 1/16; B60Q 1/076; B60Q 1/085; B60Q 1/24; B60Q 2300/056; B60Q 2300/41; B60Q 2300/42; F21S 48/1159; F21S 48/1388; F21S 48/1742; F21S 48/1757
USPC ........................ 701/49; 362/464, 466; 315/82
See application file for complete search history.

(56) References Cited

U.S. PATENT DOCUMENTS

| | | | |
|---|---|---|---|
| 7,896,512 B2 | 3/2011 | Tatara et al. | |
| 8,297,814 B2 * | 10/2012 | Tanaka et al. | 362/539 |
| 8,651,712 B2 * | 2/2014 | Suzuki | 362/466 |
| 2005/0122726 A1 * | 6/2005 | Yamamoto et al. | 362/464 |
| 2007/0025117 A1 * | 2/2007 | Watanabe et al. | 362/545 |
| 2009/0086500 A1 | 4/2009 | Tatara et al. | |

(Continued)

FOREIGN PATENT DOCUMENTS

JP  2009-087811 A  4/2009

*Primary Examiner* — Helal A Algahaim
*Assistant Examiner* — Donald J Wallace
(74) *Attorney, Agent, or Firm* — Foley & Lardner LLP

(57) ABSTRACT

The present invention provides a lamp unit for low beam and a lamp unit for high beam. A respective one of the lamp units is made of a semiconductor-type light source and a reflector that has reflection surfaces configured to emit light from the semiconductor-type light source forward of a vehicle, as a predetermined light distribution pattern. As a result, the present invention is capable of fully utilizing the light from the semiconductor-type light source and facilitating a light distribution design for forming the light in a predetermined light distribution pattern.

2 Claims, 13 Drawing Sheets

(56) References Cited

U.S. PATENT DOCUMENTS

| | | | |
|---|---|---|---|
| 2011/0012510 A1* | 1/2011 | Tani et al. | 315/82 |
| 2012/0123648 A1* | 5/2012 | Moizard et al. | 701/49 |
| 2012/0206043 A1* | 8/2012 | Yamazaki et al. | 315/82 |
| 2013/0201710 A1* | 8/2013 | Suzuki | 362/512 |

* cited by examiner

SWIVEL-MOUNTED VEHICLE HEADLAMP WITH MULTIFUNCTIONAL LIGHT DISTRIBUTION PATTERNS

CROSS REFERENCE TO RELATED APPLICATIONS

This application claims priority of Japanese Patent Application No. 2012-020870 filed on Feb. 2, 2012. The contents of the application are incorporated herein by reference in their entirety.

BACKGROUND OF THE INVENTION

1. Field of the Invention

The present invention relates to a vehicle headlamp configured to illuminate a multifunctional light distribution patterns forward of a vehicle. In addition, the present invention relates to a vehicle headlamp device that is provided with a vehicle headlamp configured to illuminate multifunctional light distribution patterns forward of a vehicle.

2. Description of the Related Art

A vehicle headlamp and a vehicle headlamp device of such a type (hereinafter, referred to as a "vehicle headlamp system) are conventionally known (for example, Japanese Unexamined Patent Application Publication No. 2009-87811). Hereinafter, a conventional vehicle headlamp system will be described. The conventional vehicle headlamp system is provided with: a main lamp unit; a projector type first subsidiary lamp unit of a projector type; and a second subsidiary lamp unit of a lens direct emission and light distribution type, each of which employs a semiconductor light emitting element as a light source. Multifunctional light distribution patterns can be obtained by turning on or off the light source of the main lamp unit, turning on or off the semiconductor light emitting element that serves as the first subsidiary lamp unit or turning on or off the semiconductor light emitting element that serves as the second lamp unit.

However, the conventional vehicle headlamp system described previously uses the first subsidiary lamp unit of the projector type; and therefore, there has been a case in which light from the semiconductor light emitting element is reflected on a reflection surface of a reflector and then shaded by means of a base member when the reflected light substantially converges in proximity to a focal point on a rear side of a projection lens. Therefore, there has been a case in which the light from the semiconductor light emitting element cannot be fully utilized. In addition, the conventional vehicle headlamp system described previously uses the second subsidiary lamp unit of the lens direct emission and light distribution type; and therefore, a light distribution design configured to form the light from the semiconductor light emitting element in a predetermined light distribution pattern by means of the projection lens is prone to be cumbersome.

SUMMARY OF THE INVENTION

The present invention has been made in order to the above described problem that there has been the case in which the light from the semiconductor light emitting element is not fully utilized, and the light distribution design configured to form the emitted light in the predetermined light distribution pattern is prone to be cumbersome in conventional vehicle headlamp systems.

A vehicle headlamp according to first aspect of the present invention comprising:
  a lamp unit for low beam configured to emit forward of a vehicle a light distribution pattern for low beam;
  a lamp unit for high beam configured to emit forward of the vehicle a light distribution pattern for high beam that is compatible with a light distribution pattern for shoulder edge beam; and
  a swivel device configured to rotate around a vertical axis the lamp unit for high beam,
  wherein a respective one of the lamp unit for low beam and the lamp unit for high beam is made of a semiconductor-type light source and a reflector configured to emit light from the semiconductor-type light source forward of the vehicle, as the light distribution pattern for low beam or the light distribution pattern for high beam that is compatible with the light distribution pattern for shoulder edge beam.

The vehicle headlamp according to second aspect of the present invention, in the first aspect, wherein
  the lamp unit for low beam is integrally configured with the lamp unit for high beam so as to be rotatable around the vertical axis by means of the swivel device.

The vehicle headlamp according to third aspect of the present invention, in the second aspect, wherein
  the vertical axis of the swivel device passes through a center or a substantial center of the lamp unit for low beam.

A vehicle headlamp device according to fourth aspect of the present invention comprising:
  the vehicle headlamp according to the first aspect to third aspect;
  a detecting portion configured to detect whether or not a preceding vehicle or an opposite vehicle forward of a driving vehicle exists; and a control portion configured to output a control signal to the semiconductor-type light source and the swivel device, based on a detection signal from the detecting portion.

The vehicle headlamp according to the first aspect of the present invention uses a lamp units of a reflector reflection and light distribution type as the lamp unit for low beams and the lamp unit for high beam. Thus, in comparison with a lamp unit of a projector type, light from the semiconductor-type light source can be sufficiently effectively utilized. In addition, in comparison with a lamp unit of a lens direct reflection and light distribution type, a light distribution design is simply made in such a manner that the light from the semiconductor-type light source is formed in predetermined light distribution patterns (the light distribution patterns for low beam and the light distribution patterns for high beam that is compatible with the light distribution patterns for shoulder edge beam) by means of the reflection surface (example, the first reflection surface and the second reflection surface) of the reflector.

Further, the vehicle headlamp according to the first aspect of the present invention is a light distribution pattern of multiple functions (the light distribution patterns for low beam and the light distribution patterns for high beam that is compatible with the light distribution patterns for shoulder edge beam) obtained by turn on and off on the light of the semiconductor-type light source for the lamp unit for low beam, and turn on and off on the light of the semiconductor-type light source for the lamp unit for high beam, and stopping of driving of the swivel device.

More further the vehicle headlamp according to the first aspect of the present invention can be directed at least one of the light distribution patterns for low beam and the light distribution patterns for high beam that is compatible with the light distribution patterns for shoulder edge beam in a horizontal direction (a transverse direction) by the swivel device. Therefore the light distribution pattern of the many functions can be obtained.

The vehicle headlamp according to the second aspect of the present invention, can be directed the light distribution patterns for low beam and the light distribution patterns for high beam that is compatible with the light distribution patterns for shoulder edge beam in a horizontal direction (a transverse direction) by the swivel device. So the light distribution pattern of the many functions can be obtained. In particular, it is possible to direct in the horizontal direction light distribution pattern for low beam in the horizontal direction, the vehicle headlamp can be in the turning direction to improve visibility when driving track path (curves) and contributes to safe driving.

The vehicle headlamp according to the third aspect of the present invention, the vertical axis of the swivel device passes through a center or a substantial center of the lamp unit for low beam. Therefore, the vehicle headlamp can be reduce the deformation of the light distribution pattern for low beam when the light distribution pattern for low beam directed in the horizontal direction by the swivel device.

The vehicle headlamp device according to the fourth aspect of the present invention, can achieve a similar effect with the vehicle headlamp according to any one of the first aspect to third aspect by means for solving the problems described above.

DESCRIPTION OF THE PREFERRED EMBODIMENTS

Figure 2:
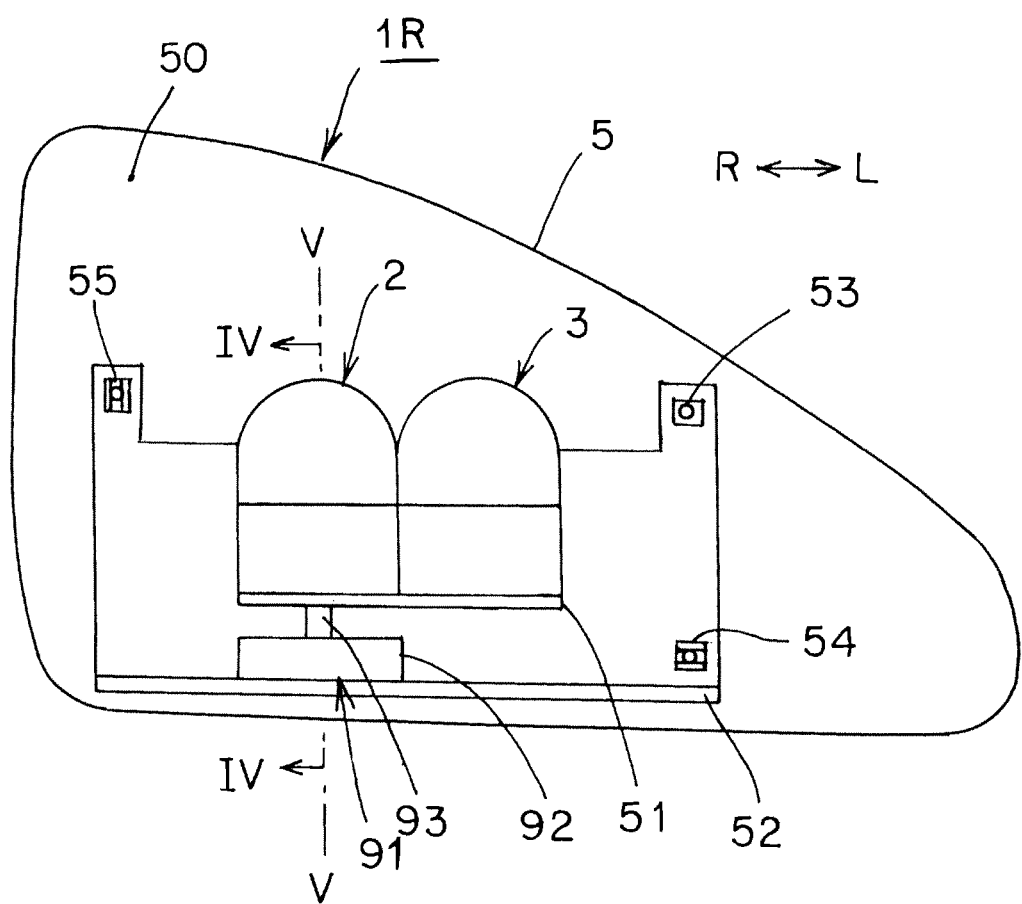
FIG. 2 is a front view showing the essential constituent elements of a right side lamp unit.
Figure 3:
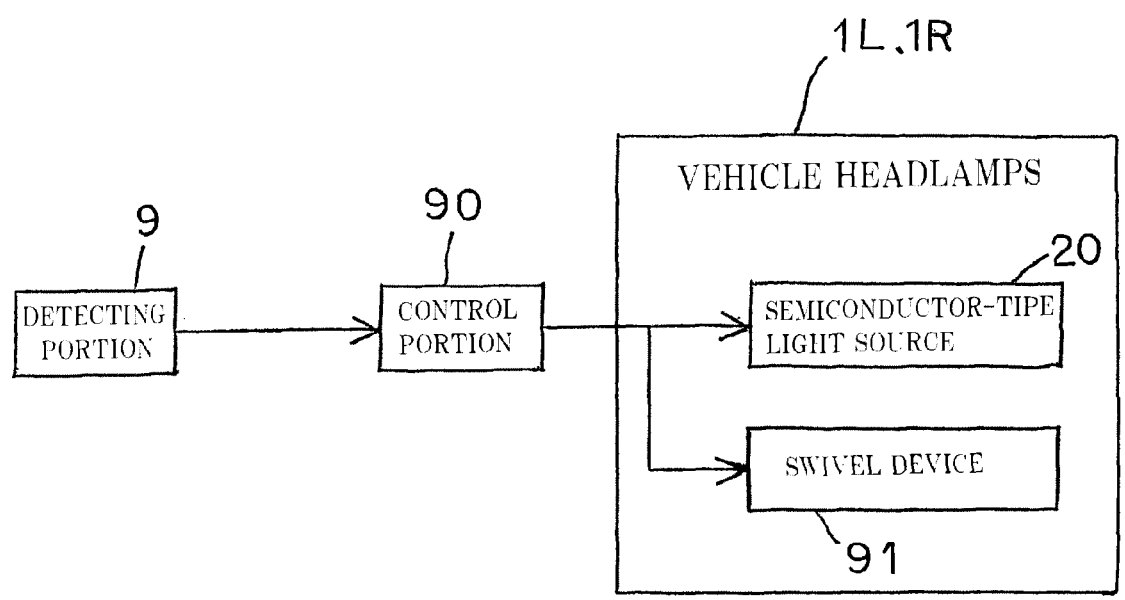
FIG. 3 is a block diagram depicting the constituent elements of a vehicle headlamp device.

Hereinafter, three examples of the preferred embodiments (exemplary embodiments) of a vehicle headlamp system according to the present invention will be described in detail with reference to the drawings. It is to be noted that the present invention is not limited by the embodiments. In FIG. 2, reference code R designates a right side, and reference code L designates a left side, respectively. In FIG. 5 to FIG. 8, reference code VU-VD designates a vertical line from the top to bottom of a screen. Reference code HL-HR designates a horizontal line from the left to right of the screen. In the present specification and the claimed attached herewith, the terms "front" "rear", "top", "bottom", "left", and "right" respectively designate the front, rear, top, bottom, left, and right to be defined when the vehicle headlamp according to the present invention is mounted on a vehicle.

Description of Configuration of First Embodiment

Figure 1:
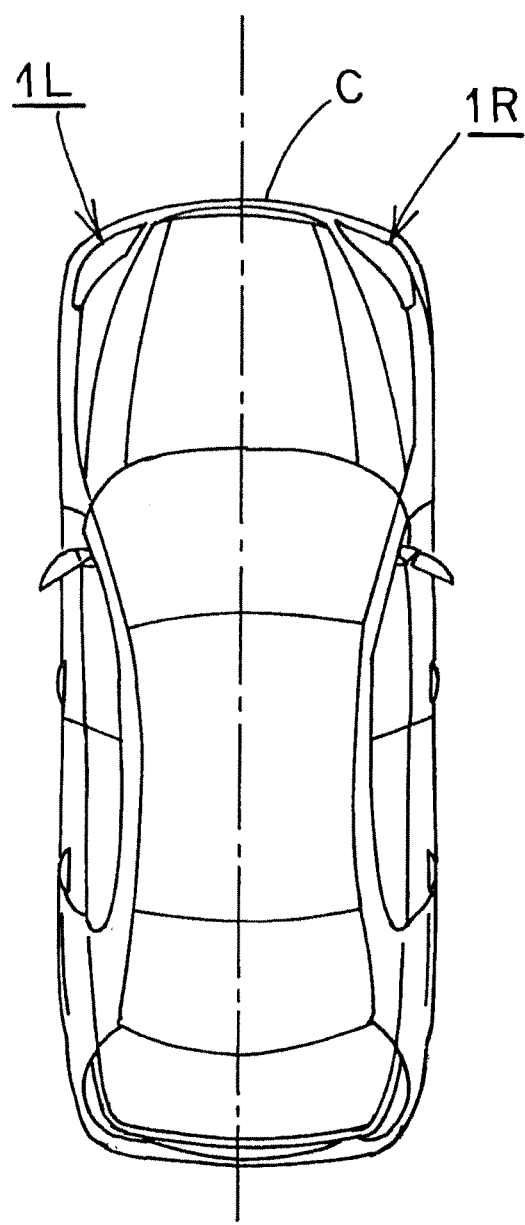
FIG. 1 shows a first embodiment of a vehicle headlamp system according to the present invention, and a plan view of a vehicle having vehicle headlamps mounted on both of the left and right sides of the vehicle.

Each of FIG. 1 to FIG. 13 shows a first embodiment of a vehicle headlamp system according to the present invention. Hereinafter, a configuration of the vehicle headlamp system according to the first embodiment will be described. In FIG. 1, reference numerals 1L and 1R designate vehicle headlamps according to the first embodiment (such as headlamps, for example). The vehicle headlamps 1L and 1R are mounted on both of the left and right end parts of a front portion of a vehicle C for left side driving). Hereinafter, a right side vehicle headlamp 1R to be mounted on the right side of the vehicle C will be described. It is to be noted that the left side vehicle headlamp 1L to be mounted on the left side of the vehicle C is made of the constituent elements that are substantially identical to those of the right side vehicle headlamp 1R; and therefore, its related description is omitted hereinafter.

Description of Vehicle headlamp 1R (1L)

The vehicle headlamp 1R (1L) described previously, as shown in FIG. 2, is provided with: a lamp unit 2 for low beam; a lamp unit 3 for high beam; a swivel device 91; a dimming control portion (refer to a control portion 90 in FIG. 3); a first mount member (a heat sink member) 51 and a second mount member (a bracket) 52; an optical axis adjustment devices 53, 54, and 55; a lamp housing 5; and a lamp lens (such as a through outer lens, for example).

The lamp unit 2 for low beam, the lamp unit 3 for high beam, the swivel device 91, the dimming control portion, the first mount member 51, the second mount member 52, and the optical axis adjustment devices 53, 54, and 55 are disposed in a lamp room 50 that is partitioned by the lamp housing 5 and the lamp lens. It is to be noted that, although not shown in the lamp room 50, there may be a case in which another lamp unit such as a fog lamp, a cornering lamp, a clearance lamp or a turn signal lamp is disposed. In addition, it is also to be noted that there may be a case in which the dimming control portion is disposed outside of the lamp room 50.

The lamp unit 2 for low beam and the lamp unit 3 for high beam are integrally mounted to the first mount member 51. The lamp unit 2 for low beam is disposed outside of a vehicle C (on a right side R in the case of a vehicle headlamp 1R on the right side or on a left side L in the case of a vehicle headlamp 1L on the left side). The lamp unit 3 for high beam is disposed inside of the vehicle C (on the right side R in the case of the vehicle headlamp 1R on the right side or on the left side L in the case of the vehicle headlamp 1L on the left side).

Description of Swivel Device 91

The swivel device 91 is made of: a drive portion (not shown) and a driving force transmission mechanism (not shown) that are housed in a casing 92; and a rotary shaft 93. By driving the drive portion, a driving force of the drive portion is transmitted to the rotary shaft 93 via the driving force transmission mechanism. As a result, the rotary shaft 93 rotates around a vertical axis V-V (including a substantially vertical axis).

The first mount member 51 is fixed to the rotary shaft 93 of the swivel device 91. The vertical axis V-V of the rotary shaft 93 of the swivel device 91 passes through a center or a substantial center of the lamp unit 2 for low beam. As a result, the lamp unit 2 for low beam and the lamp unit 3 for high beam are configured in such a manner as to be integrated with each other and to be rotatable around the vertical axis V-V via the first mount member 51 by means of the swivel device 91.

The swivel device 91 is mounted to the second mount member 52. The second mount member 52 is mounted to the lamp housing 5 via the optical axis adjustment devices 53, 54, and 55.

The swivel device 91 is connected to a control device (not shown) via a camera sensor or a steering angle sensor (no shown), for example. When a detection signal of the steering angle sensor is input to the control device, the control device outputs a control signal to the swivel device 91. As a result, the swivel device 91 is driven to rotate the lamp unit 2 for low beam and the lamp unit 3 for high beam around the vertical axis V-V in accordance with left and right swiveling of the vehicle C.

Description of Optical Adjustment Devices 53, 54, and 55

The optical axis adjustment devices 53, 54, and 55 are respectively made of: a pivot mechanism (53); top and bottom adjustment screws and screw mounting (54); and left and right adjustment screws and screw mounting (55). As a result, the lamp unit 2 for low beam and the lamp unit 3 for high beam are configured in such a manner as to be integrated with each other and to be optically adjustable, by means of the first mount member 51, the swivel device 91, and the second mount member 52.

Description of Lamp Unit 2 for Low Beam

Figure 4:
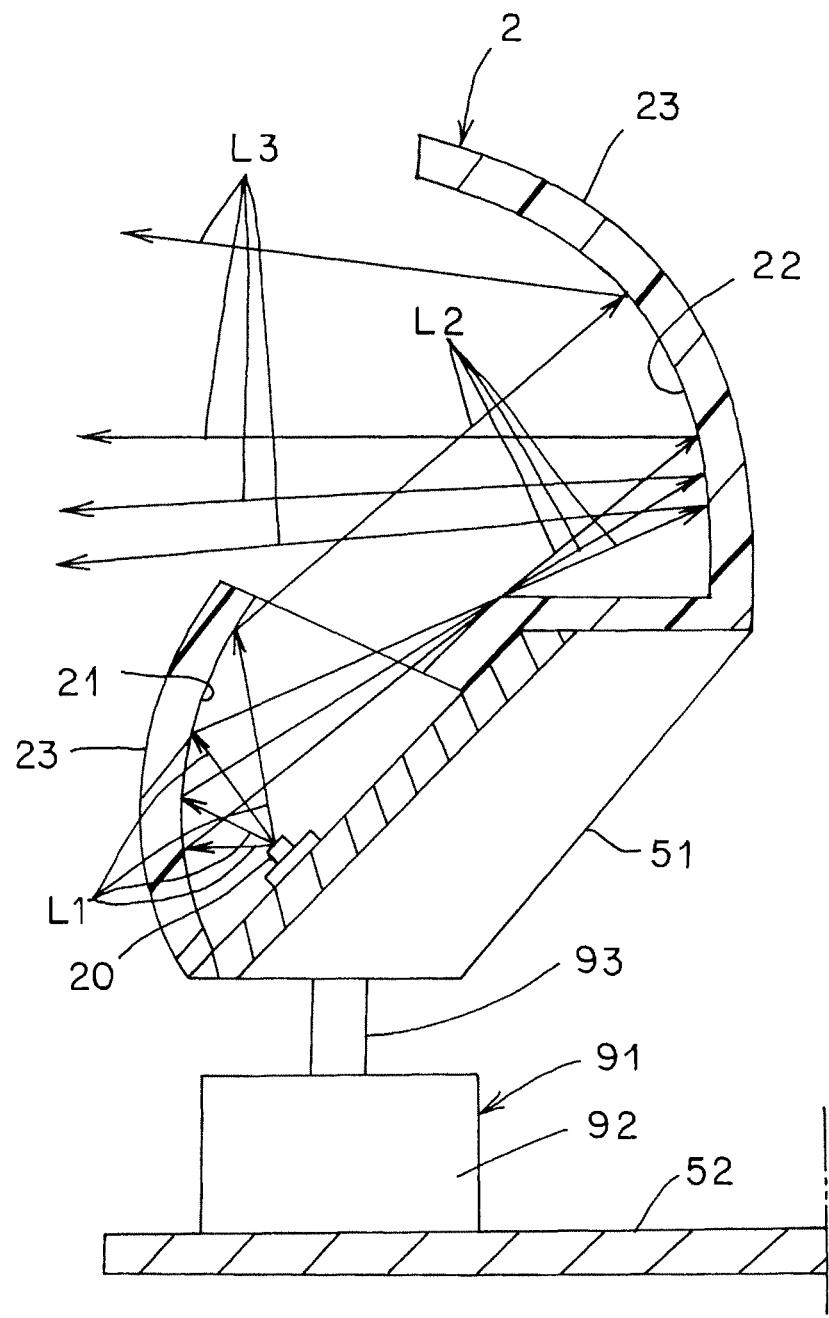
FIG. 4 is a sectional view taken along the line IV-IV in FIG. 2.

The lamp unit 2 for low beam, as shown in FIG. 4, is made of a semiconductor-type light source 20, a reflector 23, and a heat sink member that is compatible with the first mount member 51.

The semiconductor-type light source 20 uses one's own light emitting semiconductor-type light source such as an LED, an EL (an organic EL) (an LED in the exemplary embodiment), for example. The semiconductor-type light source 20 is mounted to the first mount member 51 that is compatible with the heat sink member 51, together with the reflector 23.

The reflector 23 is made of: a first reflection surface 21 that is made of an elliptical reflection surface (a reflection surface made of a free curved surface based on (on the basis of or with reference to) an ellipse, or alternatively, a reflection surface made of a rotational elliptical surface); and a second reflection surface 22 that is made of a parabolic reflection surface (a reflection surface made of a free curved surface based on (on the basis of or with reference to) a parabolic line, or alternatively, a reflection surface made of a rotational parabolic surface).

The first reflection surface 21 is configured to reflect light L1 from the semiconductor-type light source 20 to the side of the second reflection surface 22. The second reflection surface 22 is configured to reflect the reflected light L2 from the first reflection surface 21. The reflected light L3 from the second reflection surface 22 is illuminated forward of the vehicle C, as light distribution patterns for low beam LLP and RLP shown in FIG. 5.

Description of Light Distribution Patterns for Low Beam LLP and RLP

Figure 5:
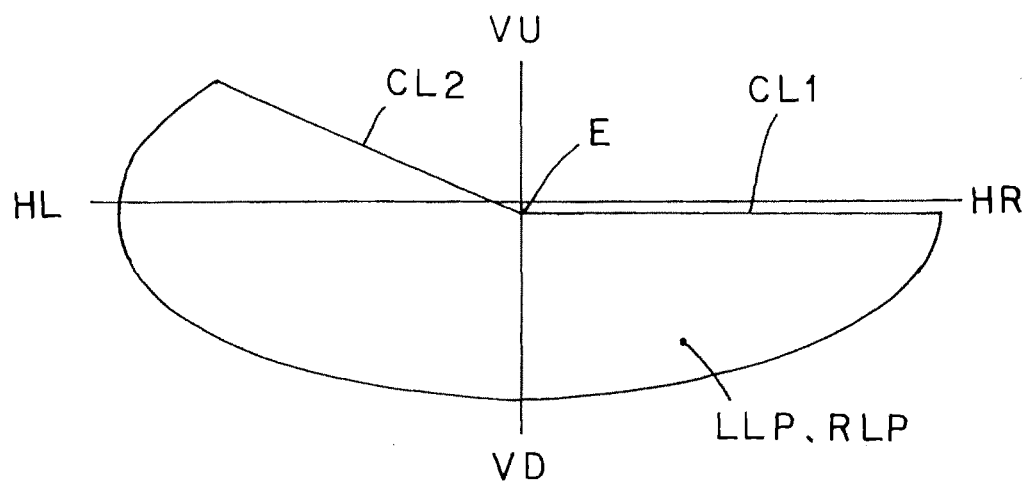
FIG. 5 is an explanatory view showing light distribution patterns for low beam on both of the left and right sides, the light distribution patterns being illuminated from lamp units for low beam on both of the left and right sides forward of the vehicle.

The light distribution pattern for low beam (the light distribution pattern for low beam on the left side) LLP that is illuminated from the lamp unit 2 for low beam of the left side vehicle headlamp 1L to the front side of the vehicle C; and the light distribution pattern for low beam (the light distribution pattern for low beam on the right side) that is illuminated from the lamp unit 2 for low beam of the right side vehicle headlamp 1R to the front side of the vehicle C, as shown in FIG. 5, have: a horizontal cutoff line CL1 that is positioned on the upper right side; a cutoff line CL2 that is obliquely positioned (at an angle of 15 degrees) on the upper left side; and an elbow point E that is positioned at a crossing point between the horizontal cutoff line CL1 and the oblique cutoff line CL2. The horizontal cutoff line CL1 is positioned in such a manner as to be slightly lower than the horizontal line HL-HR on the left to right of the screen.

Figure 9:
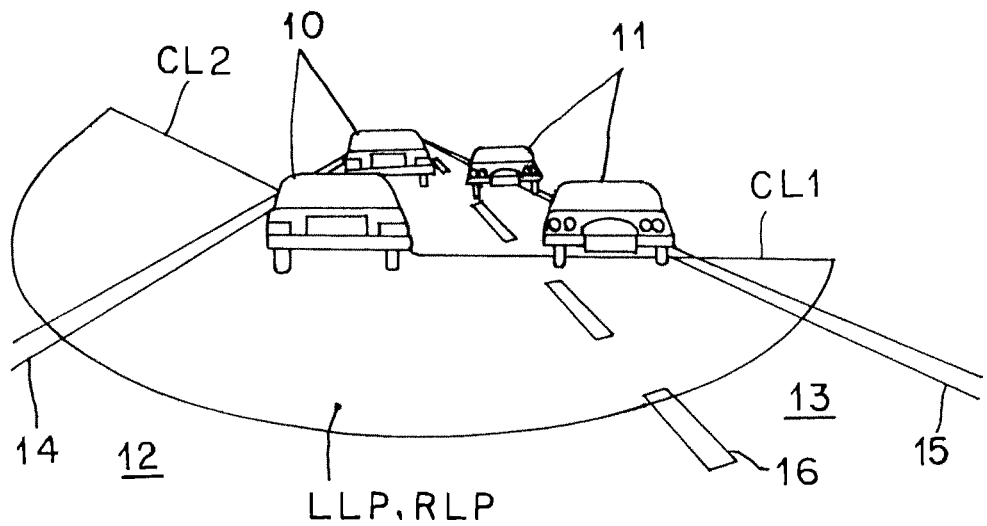
FIG. 9 is an explanatory view showing a road condition (a vehicle driving condition) that is established when light distribution patterns for low beams on both of the left and right sides are emitted forward of the vehicle.

The light distribution patterns for low beam LLP and RLP, as shown in FIG. 9, are mainly configured to scatter and illuminate a front side of a left side driving lane 12 and a right side opposite lane 1 over a wide range. It is to be noted that a Z cutoff line may be employed in place of the oblique cutoff line CL2. It is also noted that reference numeral 16 in FIG. 9 designates a center line.

Description of Lamp Unit 3 for High Beam

As is the case with the lamp unit 2 for low beam, the lamp unit 3 for high beam is made of: a semiconductor-type light source (not shown); a reflector; and a heat sink member that is compatible with the first mount member 51. The semiconductor-type light source and the reflector are mounted to the first mount member 51 that is compatible with the heat sink member.

The reflector is made of: a first reflection surface (not shown) that is made of an elliptical reflection surface (a reflection surface made of a free curved surface based on (on the basis of or with reference to) an ellipse, or a reflection surface made of a rotational elliptical surface), second reflection surface rotational elliptical surface and a second reflection surface (not shown) that is made of a parabolic reflection surface (a reflection surface made of a free curved surface based on (on the basis of or with reference to) a parabolic line, or alternatively, a reflection surface made of a rotational parabolic surface).

The first reflection surface is configured to reflect light from the semiconductor-type light source to the side of the second reflection surface. The second reflection surface is configured to reflect the reflected light from the first reflection surface. The reflected light from the second reflection surface is illuminated to the front side of the vehicle C, as light distribution patterns for high beam LHP and RHP that are compatible with a light distribution patterns for shoulder edge beam shown in FIGS. 6 to 8.

Figure 6:
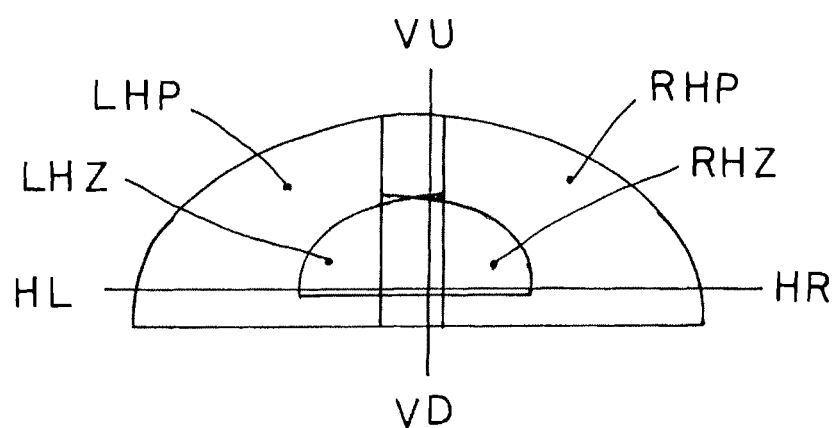
FIG. 6 is an explanatory view showing light distribution patterns for high beams that are compatible with light distribution patterns for shoulder edge beams on both of the left and right sides that are emitted forward of a vehicle from lamp units for high beam on both of the left and right sides (in other words, light distribution patterns for high beams)
Figure 7:
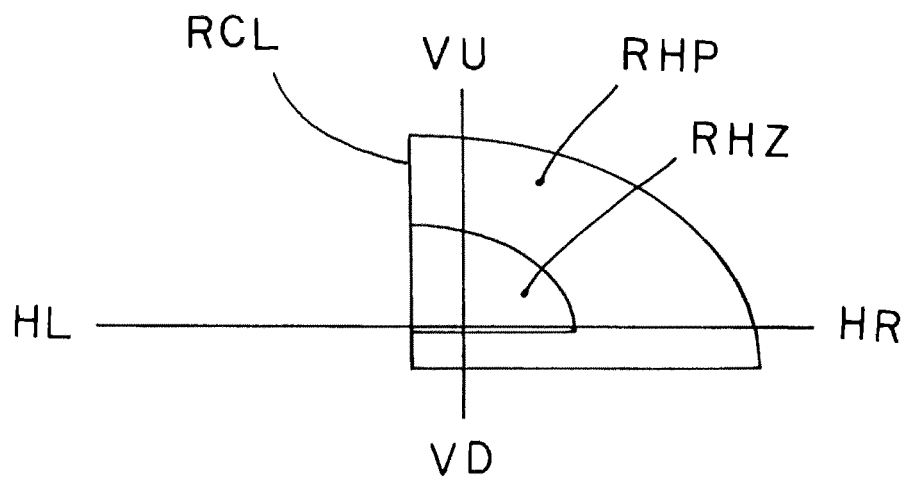
FIG. 7 is an explanatory view showing a light distribution pattern for high beam that is compatible with a light distribution pattern for shoulder edge beam that is emitted forward of the vehicle from the lamp unit for high beam on the right side (in other words, a light distribution pattern for shoulder edge beam on the right side)
Figure 8:
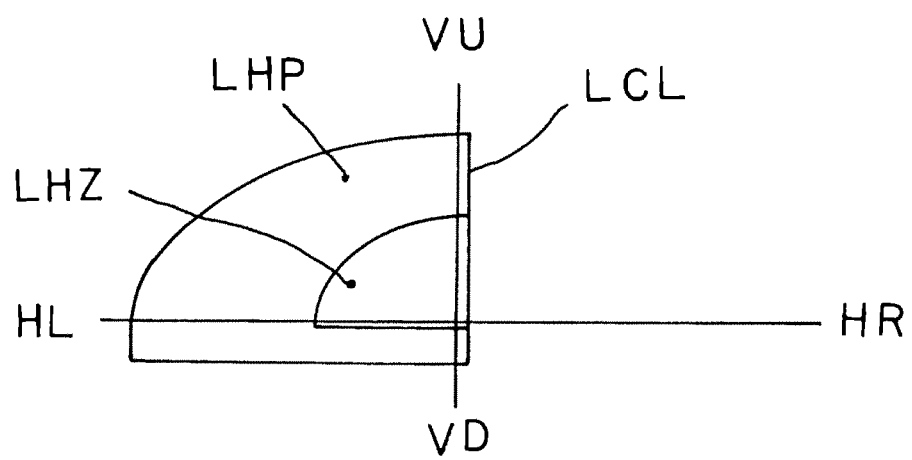
FIG. 8 is an explanatory view showing a light distribution pattern for high beam that is compatible with a light distribution pattern for shoulder edge beam that is emitted forward the vehicle from the lamp unit for high beam on the left side (in other words, a light distribution pattern for shoulder edge beam on the left side)

Description of Light Distribution Patterns for High Beams LHP and RHP that are Compatible with Light Distribution Patterns for Shoulder Edge Beams A light distribution pattern for high beam LHP that is compatible with the light distribution pattern for shoulder edge beam that is emitted to a front side of the vehicle C from the lamp unit 3 for high beam of the left side vehicle headlamp 1L (a light distribution pattern for high beam that is compatible with the light distribution pattern for shoulder edge beam on the left side), as shown in FIG. 6 and FIG. 8, has a vertical cutoff line LCL that is positioned at a center side (the right side) and a hot zone LHZ. A light distribution pattern for high beam RHP that is compatible with the light distribution pattern for shoulder edge beam that is emitted to a front side of the vehicle C from the lamp unit 3 for high beam of the vehicle headlamp 1R on the right side (a light distribution pattern for high beam that is compatible with the light distribution pattern for shoulder edge beam on the left side), as shown in FIG. 6 and FIG. 7, has a vertical cutoff line RCL that is position on the center side (the left side) and a hot zone RHZ.

The vertical cutoff line LCL of the light distribution pattern for high beam LHP that is compatible with the light distribution patter for shoulder edge beam on the left side is positioned in such a manner as to be slightly more rightward than a vertical line VU-VD from the top to bottom of a screen. The vertical cutoff line RCL of the light distribution pattern for high beam RHP that is compatible with the light distribution pattern for shoulder edge beam on the right side is positioned in such a manner as to be slightly more leftward than the vertical line VD-VD on the top and bottom of the screen.

A lower side of a respective one of the hot zones LHZ and RHZ of the light distribution patterns for high beams LHP and RHP that are compatible with the light distribution patterns for shoulder edge beams is positioned on or near below a horizontal line HL-HR from the left to right of the screen. A lower side of a respective one of the light distribution patterns for high beams LHZ and RHZ that are compatible with the light distribution patterns for shoulder beam excluding the hot zones LHZ and RHZ is positioned in such a manner as to be lower than the horizontal line HL-HR from the left and right of the screen.

A respective one of the light distribution patterns for high beams LHP and RHP that are compatible with the light distribution patterns for shoulder edge beams is equal to or more than 3 degrees in elevation in a longitudinal direction (a vertical direction), and is equal to or more than at least 10 degrees in scattering width of a lateral direction (a transverse direction). A respective one of the hot zones LHZ and RHZ of the light distribution patterns for high beams LHP and RHP that are compatible with the light distribution patterns for shoulder edge beams is set to be equal to or less than 5 degrees in a lateral direction from the vertical cutoff lines LCL and RCL; and its related light becomes weaker as the light travels in the lateral direction from the vertical cutoff lines LCL and RCL, the light having a luminous intensity of 40,000 cd to 210,000 cd.

Figure 10:
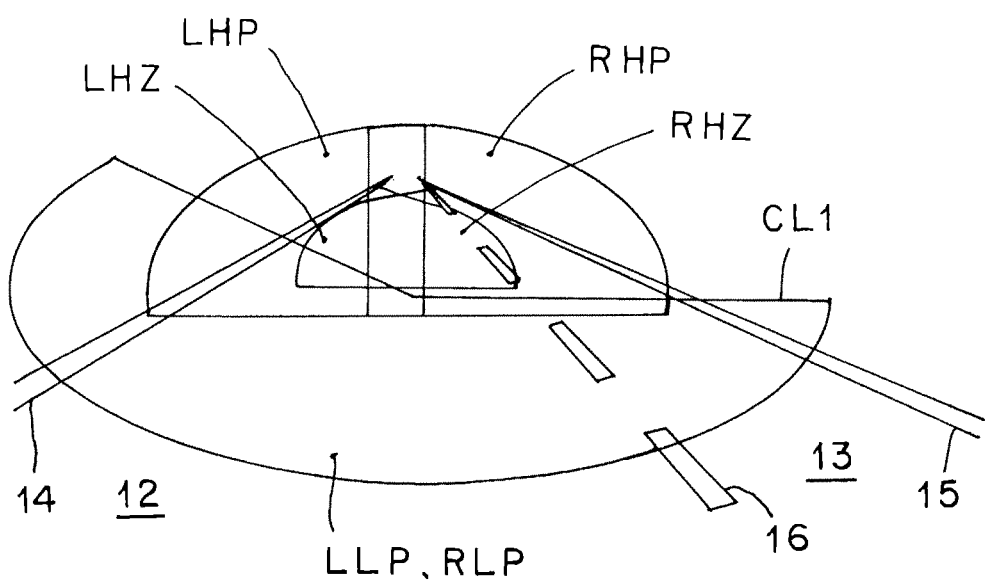
FIG. 10 is an explanatory view showing a road condition (a vehicle driving condition) that is established when light distribution patterns for low beams on both of the left and right sides that are distributed to the inside of the vehicle and light distribution patterns for high beams that are compatible with the light distribution patterns for shoulder edge beams on the left and right sides are emitted forward of the vehicle.
Figure 11:
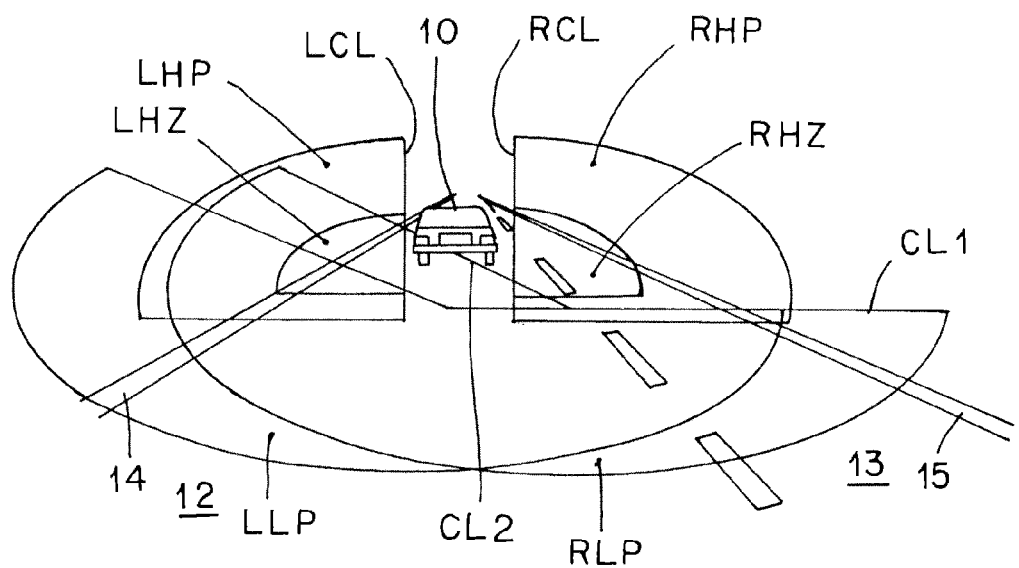
FIG. 11 is an explanatory view showing a road condition (a vehicle driving condition) that is established when light distribution patterns for low beams on both of the left and right sides that are distributed to the outside of the vehicle and light distribution patterns for high beams that are compatible with the light distribution patterns for shoulder edge beams on the left and right sides are emitted forward of the vehicle.
Figure 12:
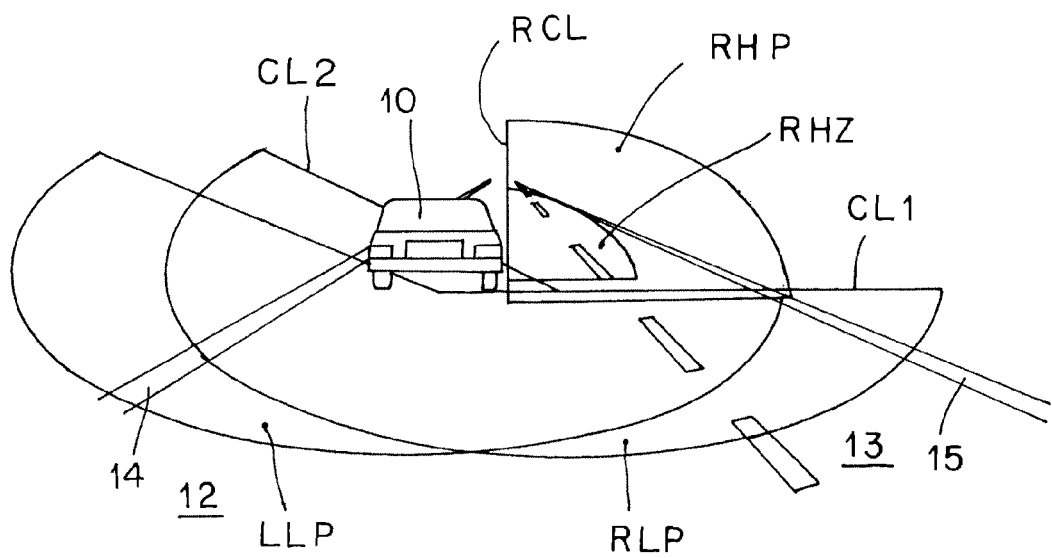
FIG. 12 is an explanatory view showing a road condition (a vehicle driving condition) that is established when the light distribution patterns for low beams on the left and right sides and a light distribution pattern for high beam that is compatible with the light distribution pattern for shoulder edge beam on the right side are emitted forward of the vehicle.
Figure 13:
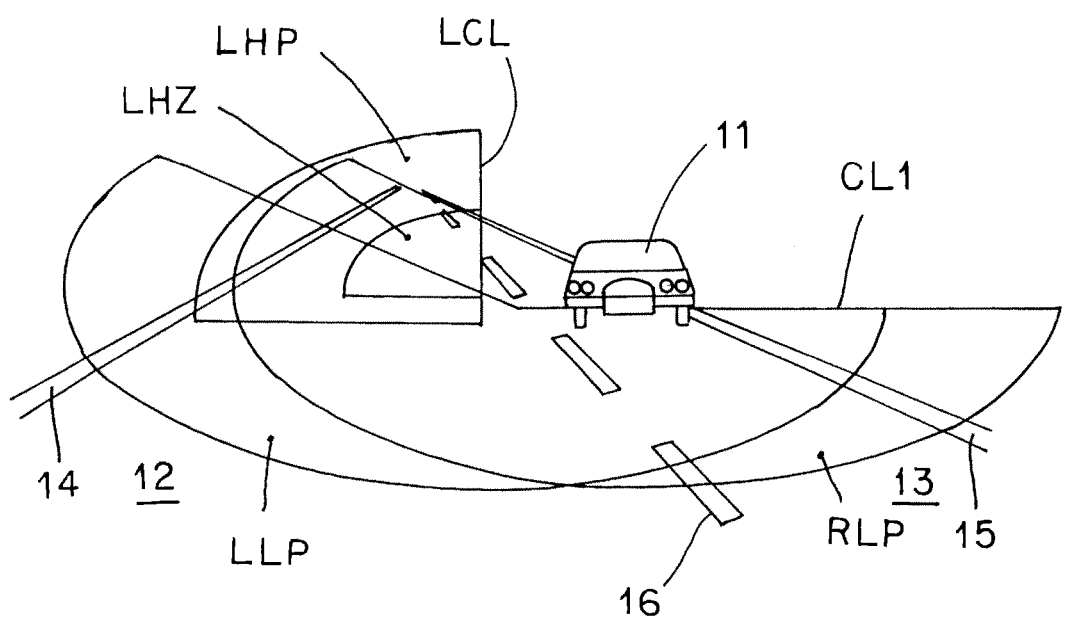
FIG. 13 is an explanatory view showing a road condition (a vehicle driving condition) that is established when the light distribution patterns for low beams on the left and right sides and a light distribution pattern for high beam that is compatible with the light distribution pattern for shoulder edge beam on the left side are emitted forward of the vehicle.

A respective one of the hot zones LHZ and RHZ of the light distribution patterns for high beams LHP and RHP that are compatible with the light distribution patterns for shoulder edge beams on both of the left and right sides is provided in such a manner that when a respective one of the swivel devices 91 on both of the left and right sides is established in an inactive state at an initial position, as shown in FIG. 6 and FIG. 10, a portion of the vertical cutoff line LCL of the light distribution pattern for high beam LHP that is compatible with the light distribution pattern for shoulder edge beam on the left side and a portion of the vertical cutoff line RCL of the light distribution pattern for high beam RHP that is compatible with the light distribution pattern for shoulder edge beam on the right side overlap each other, mainly optically focusing and illuminating a distant side of a driving lane 12 and an opposite lane 13. In addition, when the swivel devices 91 on both of the left and right sides are established in such a state as to be rotationally driven outside of the vehicle C, or alternatively, when the swivel devices 91 on both of the left and right sides are established in such a state as to be rotationally driven from the outside of the vehicle C to the left side (to the side of the driving lane 12) or in such a state as to be rotationally driven to the right side (to the side of the opposite lane 13), the light distribution patterns for high beams LHP and RHP that are compatible with the light distribution patterns for shoulder edge beams on both of the left and right sides are respectively independently distributed leftward and rightward, as shown in FIG. 11 to FIG. 13, mainly illuminating a shoulder edge 14 on the driving lane side and a shoulder edge 15 on the opposite lane side.

Description of Dimming Control Portion

The dimming control portion is connected to the semiconductor-type light source 20 of the lamp unit 2 for low beam and the semiconductor-type light source of the lamp unit 3 for high beam (hereinafter, this light source may be solely referred to as a "semiconductor-type light source 20"). The dimming control portion is configured to control dimming of the semiconductor-type light source 20 in order to gradually increase or gradually decrease luminous intensities of the light distribution patterns for low beam LLP and RLP, the light distribution patterns for high beam LHP and RHP that are compatible with the light distribution patterns for shoulder edge beam. Dimming control of the semiconductor-type light source 20 is based on binary notation pulse width modulation, for example, and is carried out by decreasing and increasing a duty ratio of an ON pulse width or a duty ratio of an OFF pulse width.

Description of Vehicle Headlamp System

A vehicle headlamp system is provided with: the vehicle headlamps 1L and 1R; a detecting portion 9 configured to detect whether or not a preceding vehicle 10 or an opposite vehicle 11 exists; and a control portion 90 configured to output a control signal to the vehicle headlamps 1L and 1R, based on a detection signal from the detecting portion 9. The control portion 90 may be compatible with the control device of the swivel device 91.

The detecting portion 9 outputs a first detection signal to the control portion 90 if one or a plurality of preceding vehicles 10 and opposite vehicles 11 exist forward of a driving vehicle, as shown in FIG. 9; outputs a second detection signal to the control portion 90 if neither a preceding vehicle 10 nor an opposite vehicle 11 exists forward of the driving vehicle, as shown in FIG. 10; outputs a third detection signal to the control portion 90 if one or a plurality of forward vehicles 10 is/are distant from the driving vehicle and no opposite vehicle 11 exists forward of a driving vehicle, as shown in FIG. 11; and outputs a fourth detection signal to the control portion 90 if one or a plurality of preceding vehicles 10 approach and no opposite vehicle 11 exists forward of the driving vehicle, as shown in FIG. 12; and outputs a fifth detection signal to the control portion 90 if no preceding vehicle 10 exists or a plurality of opposite vehicles 11 approach and exist forward of a driving vehicle, as shown in FIG. 13. The detecting portion 9 uses a CCD camera, for example.

The control portion 90 is provided with the dimming control portion. The control portion 90 uses an ECU or the like, for example. The control portion 90 outputs a first control signal to the semiconductor-type light source 20 and the swivel device 91 of the vehicle headlamps 1L and 1R by means of the first detection signal from the detecting portion 9; outputs a second control signal to the semiconductor-type light source 20 and the swivel device 91 of the vehicle headlamps 1L and 1R by means of the second detection signal from the detecting portion 9; outputs a third control signal to the semiconductor-type light source 20 and the swivel device 91 of the vehicle headlamps 1L and 1R by means of the third detection signal from the detecting portion 9; outputs a fourth control signal to the semiconductor-type light source 20 and the swivel device 91 of the vehicle headlamps 1L and 1R by means of the fourth detection signal from the detecting portion 9; and outputs a fifth control signal to the semiconductor-type light source 20 and the swivel device 91 of the vehicle headlamps 1L and 1R by means of the fifth detection signal from the detecting portion 9.

The vehicle headlamps 1L and 1R are provided in such a manner that control of turning on or off of the semiconductor-type light source 20 and control of activation or deactivation of the swivel device 91 are carried out by means of the control signal from the control portion 90 based on the detection signal from the detecting portion 9.

In other words, by means of the first control signal from the control portion 90, the semiconductor-type light source 20 of the lamp unit 2 for low beam is controlled in an illuminative state, the semiconductor-type light source of the lamp unit 3 for high beam are controlled in a non-illuminative state, and the swivel device 91 is controlled in an inactive state at the initial position.

By means of the second control signal from the control portion 90, the semiconductor-type light source 20 of the lamp unit 2 for low beam and the semiconductor-type light source of the lamp unit 3 for high beam are controlled in an illuminative state, and the swivel device 91 is controlled in an inactive state at the initial position.

By means of the third control signal from the control portion 90, the semiconductor-type light source 20 of the lamp unit 3 for low beam are controlled in an illuminative state, the semiconductor-type light source of the lamp unit 3 for high beam is controlled in a non-illuminative state, and the swivel device 91 is controlled to rotate drive state to the outside of the vehicle C from an inactive state at the initial position.

By means of the fourth control signal from the control portion 90, the semiconductor-type light source 20 of the lamp unit 2 for low beam and the semiconductor-type light source of the lamp unit 3 for high beam on the right side are controlled in an illuminative state; the semiconductor-type light source of the lamp unit 3 for high beam on the left side are controlled in a non-illuminative state, and the swivel device 91 is controlled in a state in which the swivel device is driven to swivel to the left direction from in the rotate drive state at the outside of the vehicle C. In this case, at a time point when the swivel device 91 has reached its own left side swivel range, the semiconductor-type light source of the lamp unit 3 for high beam on the left side is controlled in a non-illuminative state.

By means of the fifth control signal from the control portion 90, the semiconductor-type light source 20 of the lamp unit 2 for low beam and the semiconductor-type light source of the lamp unit 3 for high beam on the left side are controlled in an illuminative state, and the semiconductor-type light source of the lamp unit 3 for high beam on the right side is controlled in a non-illuminative state, and the swivel device 91 is controlled in a state in which the swivel device is driven to rotate to the right side from in rotate drive state at the outside of the vehicle C. In this case, at a time point when the swivel device 91 has reached a right side rotation range, the semiconductor-type light source of the lamp unit 4 for high beam on the right side is controlled in a non-illuminative state.

Description of Functions of First Embodiment

The vehicle headlamp system according to the first embodiment (the vehicle headlamps 1L and 1R and the vehicle headlamp device) is made of the constituent elements as described above, and hereinafter, its related functions will be described.

First, as shown in FIG. 9 to FIG. 13, the light distribution patterns for low beam LLP and RLP on both of the left and right sides are illuminated forward of the vehicle C (one's own vehicle in the Description of Functions of First embodiment section) from the lamp units 2 for low beam of the vehicle headlamps 1L and 1R on both of the left and right sides.

Here, as shown in FIG. 9, if one or a plurality of preceding vehicles 10 and opposite vehicles 11 exist forward of the vehicle C, the detecting portion 9 outputs the first detection signal to the control portion 90 and then the control portion 90 outputs the first control signal to the vehicle headlamps 1L and 1R and the swivel device 91. Afterwards, the semiconductor-type light source 20 of the lamp unit 2 for low beam is controlled in an illuminative state, the semiconductor-type light source of the lamp unit 3 for high beam are controlled in a non-illuminative state, and the swivel device 91 is controlled in an inactive state at the initial position.

Therefore, as shown in FIG. 9, only the light distribution patterns for low beam LLP and RLP on both of the left and right sides are illuminated forward of the vehicle C from the lamp units 2 for low beam of the vehicle headlamps 1L and 1R on both of the left and right sides. As a result, by means of the light distribution patterns for low beam LLP and RLP on both of the left and right sides, the front sides of the driving lane 12 and the opposite lane 13 can be illuminated over a wide range. On the other hand, by means of the horizontal cutoff lines CL1 and the oblique cutoff line CL2 of the light distribution patterns for low beam LLP and RLP on both of the left and right sides, there can hardly occur a case in which nuisance light to one or a plurality of preceding vehicles 10 and opposite vehicles 11 forward of the vehicle C, making it possible to contribute to safe driving.

Herein, as shown in FIG. 10, if no preceding vehicle 10 and opposite vehicle 11 exist forward of the vehicle C, the detecting portion 9 outputs the second detection signal to the control portion 90 and then the control portion 90 outputs the second control signal to the vehicle headlamps 1L and 1R and the swivel device 91. Afterwards, the semiconductor-type light source 20 (the semiconductor-type light source 20 of the lamp unit 2 for low beam and the semiconductor-type light source of the lamp unit 3 for high beam) is controlled in an illuminative state, and the swivel device 91 is controlled in an inactive state at the initial position.

In the light of the foregoing description, as shown in FIG. 10, those which are emitted forward of the vehicle C are light distribution patterns for low beams LLP and RLP on the left and right sides from the lamp unit 2 for low beam of the vehicle headlamps 1L and 1R on both of the left and right sides; and the light distribution patterns for high beams LHP and RHP that are compatible with the light distribution patterns for shoulder edge beams on both of the left and right sides from the lamp units 3 for high beams of the vehicle headlamps 1L and 1R on both of the left and right sides. As a result, by means of the light distribution patterns for high beams LHP and RHP that are compatible with the light distribution patterns for shoulder edge beams on both of the left and right sides on which the light distribution patterns for low beams LLP and RLP on both of the left and right sides and portions of the vertical cutoff lines LCL and RCL overlap each other, a front side and a distant side of the driving lane 12 and the opposite lane 13, and further, the shoulder edge 14 on the driving lane side and the shoulder edge 15 on the opposite lane side can be illuminated over a wide range, making it possible to contribute to safe driving.

Here, a lower side of the horizontal cutoff line CL1 of the light distribution patterns for low beam LLP and RLP on both of the left and right sides and a lower side the light distribution pattern for high beam RHP that is compatible with the light distribution pattern for shoulder edge beam on the right side excluding the hot zone RHZ overlap on each other. Therefore, in an overlap portion between the light distribution patterns for low beam LLP and RLP and the light distribution pattern for high beam RHP that is compatible with the light distribution pattern for shoulder edge beam on the right side, there can hardly occur a case in which a line of intense light or a line of missing of light is generated. As a result, a visual recognition property in this overlap portion is improved, making it possible to contribute to safe driving.

Subsequently, as shown in FIG. 11, if one or a plurality of preceding vehicles 10 is/are distant and no opposite vehicle 11 exists forward of the vehicle C, the detecting portion 9 outputs the third detection signal to the control portion 90 and then the control portion 90 outputs the third control signal to the vehicle headlamps 1L and 1R and the swivel device 91. Afterwards, the semiconductor-type light source 20 of the lamp unit 2 for low beam and the semiconductor-type light source of the lamp unit 3 for high beam are controlled in an illuminative state, and the swivel device 91 is controlled in an inactive state at the initial position.

In the light of the foregoing description, as shown in FIG. 11, those which are distributed in a horizontal direction from the inside to outside of the vehicle C and then are emitted forward of the vehicle C are light distribution patterns for low beams LLP and RLP on the left and right sides from the lamp unit 2 for low beam of the vehicle headlamps 1L and 1R on both of the left and right sides; and the light distribution patterns for high beams LHP and RHP that are compatible with the light distribution patterns for shoulder edge beams on both of the left and right sides from the lamp units 3 for high beams of the vehicle headlamps 1L and 1R on both of the left and right sides. As a result, by means of the light distribution patterns for low beams LLP and RLP on both of the left and right sides that are distributed to the outside of the vehicle C, the front side of the driving lane 12 and the opposite lane 13 can be illuminated over a wide range, and by means of the light distribution patterns for high beams LHP and RHP that are compatible with the light distribution patterns for shoulder edge beams on both of the left and right sided that are distributed to the outside of the vehicle C, there can be illuminated the shoulder edge 14 of the driving lane side and the shoulder edge 15 of the opposite lane side. On the other hand, by means of an oblique cutoff line CL2 of the light distribution pattern for low beam RLP and the vertical cutoff lines LCL and RCL of the light distribution patterns for high beams LHP and RHP that are compatible with the light distribution patterns for shoulder edge beams on both of the left and right sides, no nuisance light is imparted to one or a plurality of preceding vehicles 10 forward of the vehicle C, making it possible to contribute to safe driving.

Here, in an overlap portion between a lower side of the horizontal cutoff line CL1 of the light distribution patterns for low beam LLP and RLP on both of the left and right sides and a lower side of the light distribution pattern for high beam RHP that is compatible with the light distribution pattern for shoulder edge beam on the right side excluding the hot zone RHZ, there can hardly occur a case in which a line of intense light or a line of missing of light is generated. As a result, the visual recognition property in this overlap portion is improved, making it possible to contribute to safe driving.

In addition, as shown in FIG. 12, if one or a plurality of preceding vehicles 10 approach and no opposite vehicle 11 exists forward of the vehicle C, the detecting portion 9 outputs the fourth signal to the control portion 90 and then the control portion 90 outputs the fourth control signal to the vehicle headlamps 1L and 1R and the swivel device 91. Afterwards, the semiconductor-type light source 20 of the lamp unit 2 for low beam and the semiconductor-type light source of the lamp unit 3 for high beam on the right side are controlled in an illuminative state, the semiconductor-type light source of the lamp unit 3 for high beam on the left side are controlled in a non-illuminative state, and the swivel device 91 is controlled in a state in which the swivel device is driven to swivel to the left side (to the side of the driving lane 12). Here, at a time point when the swivel device 91 has reached its own left side swivel range, the semiconductor-type light source of the lamp unit 3 for high beam on the left side is controlled in a non-illuminative state.

In the light of the foregoing description, as shown in FIG. 12, those which are emitted forward of the vehicle C are the light distribution patterns for low beams LLP and RLP on both of the left and right sides from the lamp unit 2 for low beam of the vehicle headlamps 1L and 1R on both of the left and right sides; and the light distribution pattern for high beam RHP that is compatible with the light distribution pattern for shoulder edge beam on the right side from the lamp unit 3 for high beam of the vehicle headlamp 1R on the right side, and further, those which are distributed to the left side are the light distribution patterns for low beams LLP and RLP on both of the left and right sides; and the light distribution pattern for high beam RHP that is compatible with the light distribution pattern for shoulder edge beam on the right side. As a result, by means of the light distribution patterns for low beams LLP and RLP on both of the left and right sides that are distributed to the left side, the front side of the driving lane 12 and the opposite lane 13 and the shoulder edge 14 of the driving lane side can be illuminated over a wide range, and by means of the light distribution pattern for high beam RHP that is compatible with the light distribution pattern for shoulder edge beam on the right side that is distributed to the left side, there can be illuminated the right side of the driving lane 12 and the distant side of the opposite lane 13. On the other hand, by means of the oblique cutoff line CL2 of the light distribution pattern for low beam on the right side RLP that is distributed to the left side; and the vertical cutoff line RCL of the light distribution pattern for high beam RHP that is compatible with the light distribution pattern for right side shoulder edge beam that is distributed to the left side, no nuisance light is imparted to one or a plurality of preceding vehicles 10 that are approaching forward of the vehicle C, making it possible to contribute to safe driving.

Here, in an overlap portion between a lower side of the horizontal cutoff line CL1 of the light distribution patterns for low beam LLP and RLP on both of the left and right sides and a lower side of the light distribution pattern for high beam RHP that is compatible with the light distribution pattern for shoulder edge beam on the right side excluding the hot zone RHZ, there can hardly occur a case in which a line of intense light or a line of missing of light is generated. As a result, the visual recognition property in this overlap portion is improved, making it possible to contribute to safe driving.

In addition, as shown in FIG. 13, if no preceding vehicle 10 exists forward of the vehicle C or if one or a plurality of opposite vehicles 11 approach and exist forward thereof, a detecting portion 9 outputs a fifth detection signal to a control portion 90 and then the control portion 90 outputs a fifth control signal to the vehicle headlamps 1L and 1R and the swivel device 91. Afterwards, a semiconductor-type light source 20 of the lamp unit 2 for low beam and a semiconductor-type light source of the lamp unit 3 for high beam on the left side are controlled in such a manner as to turn on the light, the semiconductor-type light source of the lamp unit 3 for high beam on the right side is controlled in such a manner as to turn off the light, and the swivel device 91 is controlled in such a state as to be rotationally driven to the right side (to the side of the opposite lane 13). Then at a time point at which the swivel device 91 has reached a limit of a right side rotation range, the semiconductor-type light source, the semiconductor-type light source of the lamp unit 3 for high beam on the right side is controlled in such a manner as to turn off the light.

In the light of the foregoing description, as shown in FIG. 13, those which are emitted forward of the vehicle C are the light distribution patterns for low beams LLP and RLP on both of the left and right sides from the lamp unit 2 for low beam of the vehicle headlamps 1L and 1R on both of the left and right sides; and the light distribution pattern for high beam LHP that is compatible with the light distribution pattern for shoulder edge beam on the right side from the lamp unit 3 for high beam of the vehicle headlamp 1L on the left side, and further, those which are distributed to the left side are the light distribution patterns for low beams LLP and RLP on both of the left and right sides; and the light distribution pattern for high beam LHP that is compatible with the light distribution pattern for shoulder edge beam on left right side. As a result, by means of the light distribution patterns for low beams LLP and RLP on both of the left and right sides that are distributed to the left side, the front side of the driving lane 12 and the opposite lane 13 and the shoulder edge 15 of the opposite lane side can be illuminated over a wide range, and by means of the light distribution pattern for high beam LHP that is compatible with the light distribution pattern for shoulder edge beam on the left side that is distributed to the right side, there can be illuminated distant side of the driving lane 12 and the opposite lane 13 and the shoulder edge 14 of the driving lane side. On the other hand, by means of the horizontal cutoff line CL1 of the light distribution pattern for low beam LLP on the left side that is distributed to the right side; and the vertical cutoff line LCL of the light distribution pattern for high beam LHP that is compatible with the light distribution pattern for shoulder edge beam on the right side that is distributed to the left side, no nuisance light is imparted to one or a plurality of opposite vehicles 11 that are approaching forward of the vehicle C, making it possible to contribute to safe driving.

Each of FIG. 9 to FIG. 13 is an explanatory view of a case of a straight route. In the case of a curved route, the light distribution patterns for low beam LLP and RLP on both of the left and right sides; the light distribution patterns for high beam LHP and RHP on both of the left and right sides; and the light distribution pattern for high beam LHP and RHP that are compatible with the light distribution pattern for shoulder edge beam on both of the left and right sides are distributed in a horizontal direction (in a transverse direction) in accordance with left and right steering swiveling of the vehicle C.

Description of Advantageous Effects of First Embodiment

The vehicle headlamp system according to the first embodiment (the vehicle headlamps 1L and 1R and the vehicle headlamp device) are made of the constituent elements and functions as described above, and hereinafter, its related advantageous effects will be described.

The vehicle headlamp system according to the first embodiment uses lamp units of a reflector reflection and light distribution type as the lamp units 2 for low beams on both of the left and right sides and the lamp units 3 for high beams on both of the left and right sides. Thus, in comparison with a lamp unit of a projector type, light L1 from the semiconductor-type light source 20 can be sufficiently effectively utilized. In addition, in comparison with a lamp unit of a lens direct reflection and light distribution type, a light distribution design is simply made in such a manner that the light L1 from the semiconductor-type light source 20 is formed in predetermined light distribution patterns (the light distribution patterns for low beams LLP and RLP on both of the left and right sides and the light distribution patterns for high beams LHP and RHP that are compatible with the light distribution patterns for shoulder edge beams on both of the left and right sides) by means of the first reflection surface 21 and the second reflection surface 22 of the reflector 23.

Moreover, the vehicle headlamp system according to the first embodiment is provided in such a manner that multifunctional light distribution patterns (multifunctional light distribution patterns that are obtained by using a combination of the light distribution patterns for low beam LLP and RLP on both of the left and right sides, the light distribution patterns for high beam LHP and RHP that are compatible with the light distribution pattern for shoulder edge beam on both of the left and right sides) can be obtained by turning on or off the semiconductor-type light sources 20 of the lamp units 2 for low beam on both of the left and right sides, turning on or off the semiconductor-type light sources of the lamp units 3 for high beam, driving stop of the swivel device 91.

The vehicle headlamp system according to the first embodiment is provided in such a manner that the light distribution patterns for low beam LLP and RLP on both of the left and right sides, the light distribution patterns for high beam LHP and RHP that are compatible with the light distribution pattern for shoulder edge beam on both of the left and right side can be distributed in a horizontal direction (in a transverse direction) by means of the swivel device 91; and therefore, further multifunctional light distribution patterns can be obtained. In addition, the light distribution patterns for low beam LLP and RLP on both of the left and right sides can be distributed in a horizontal direction; and therefore, the visual recognition property in a swivel direction at the time of driving on a curved route (a curve) can be enhanced, making it possible to contribute to safe driving.

The vehicle headlamp system according to the first embodiment is provided in such a manner that the vertical axis V-V of the rotary shaft 93 of the swivel device 91 passes through a center or a substantial center of the lamp unit 2 for low beam; and therefore, when the light distribution patterns for low beam LLP and RLP on both of the left and right sides are distributed in a horizontal direction by means of the swivel device 91, deformation of the light distribution patterns for low beam LLP and RLP on both of the left and right sides can be reduced to their required minimum levels.

Description of Second Embodiment

FIG. 14 to FIG. 17 each shows a second embodiment of the vehicle headlamps according to the present invention. Hereinafter, the vehicle headlamps in the second embodiment will be described. In the figures, like constituent elements in FIG. 1 to FIG. 13 are designated by like reference numerals.

Figure 14:
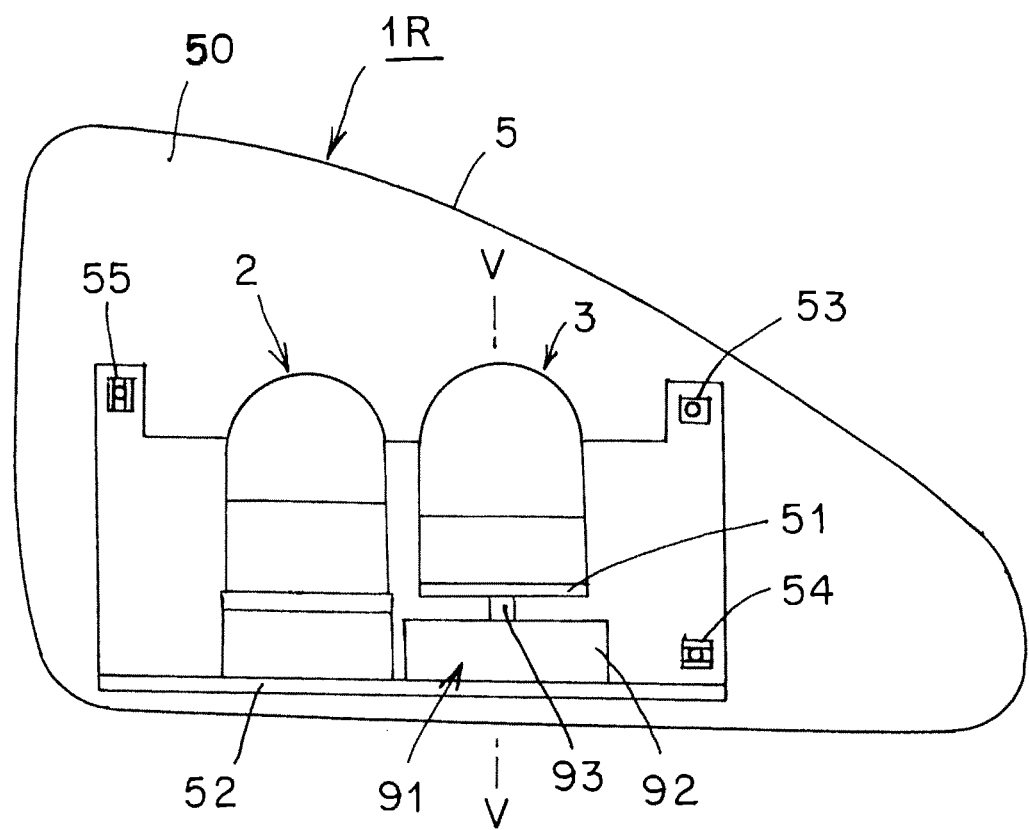
FIG. 14 is a front view of essential constituent elements of a right side lamp unit showing a second embodiment of a vehicle headlamp system according to the present invention.

A respective one of the vehicle headlamps 1L and 1R according to the first embodiment is provided in such a manner that as shown in FIG. 2, a lamp unit 2 for low beam and a lamp unit 3 for high beam are integrally configured so as to be rotatable around a vertical axis V-V by means of a swivel device 91 via a first mount member 51. On the other hand, a respective one of the vehicle headlamps according to the second embodiment is provided in such a manner that as shown in FIG. 14, only the lamp unit 3 for high beam is configured so as to be rotatable around the vertical axis V-V by means of the swivel device 91 via the first mount member 51, whereas the lamp unit 2 for low beam is fixed to a second mount member 52.

Figure 15:
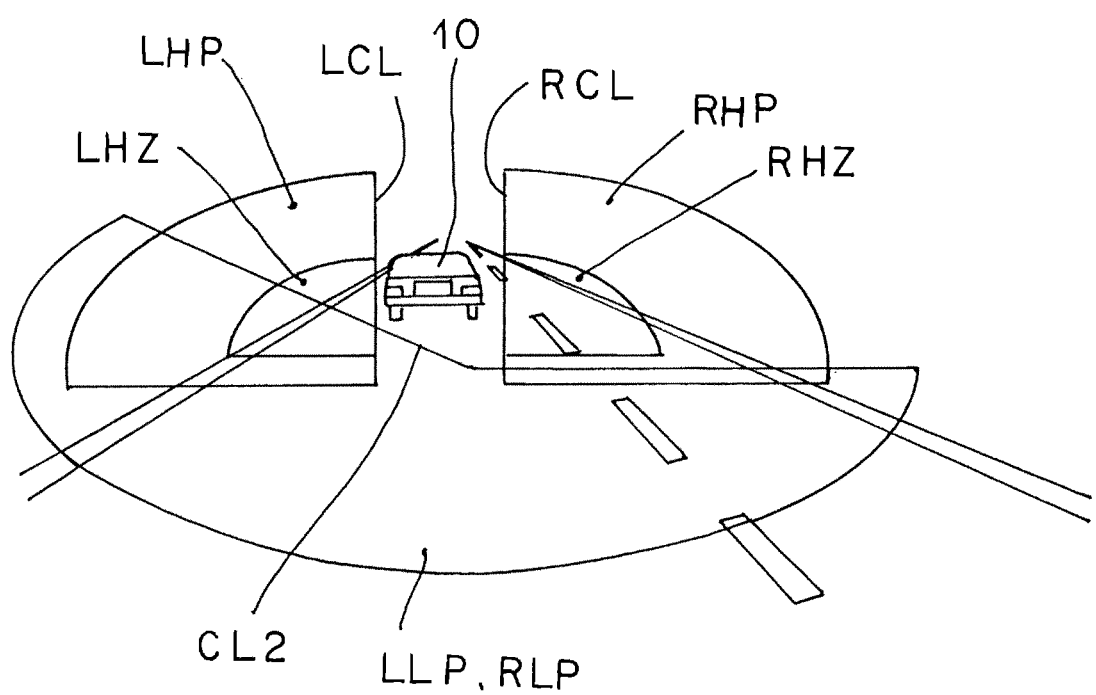
FIG. 15 is an explanatory view showing a road condition (a vehicle driving condition) that is established when the light distribution patterns for low beams on the left and right sides and light distribution patterns for high beams that are compatible with the light distribution pattern for shoulder edge beam on both of the right and left sides are emitted forward of the vehicle.
Figure 16:
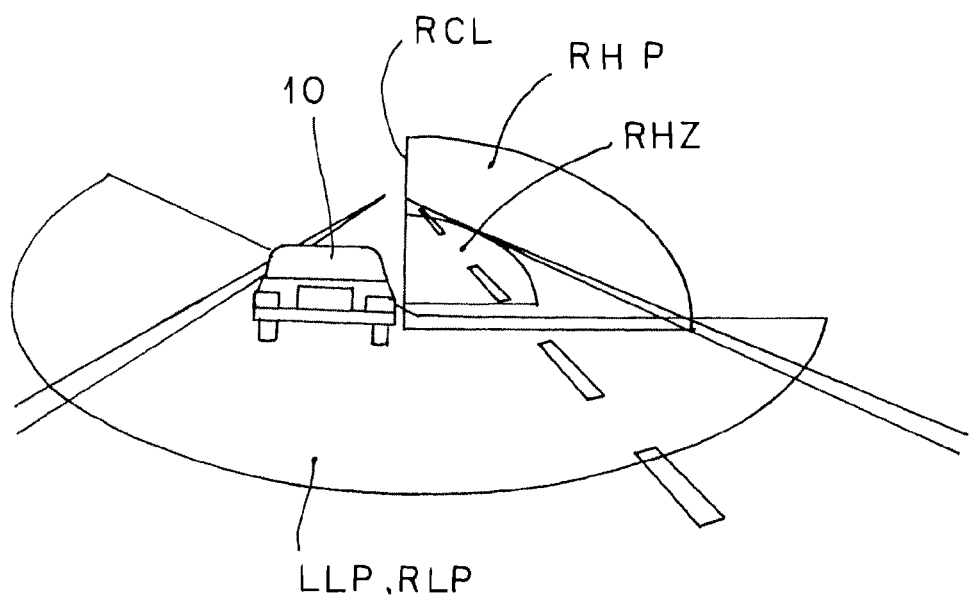
FIG. 16 is an explanatory view showing a road condition (a vehicle driving condition) that is established when the light distribution patterns for low beams on the left and right sides and light distribution patterns for high beams, a respective one of which is compatible with the light distribution pattern for shoulder edge beam on the right side are emitted forward of the vehicle.
Figure 17:
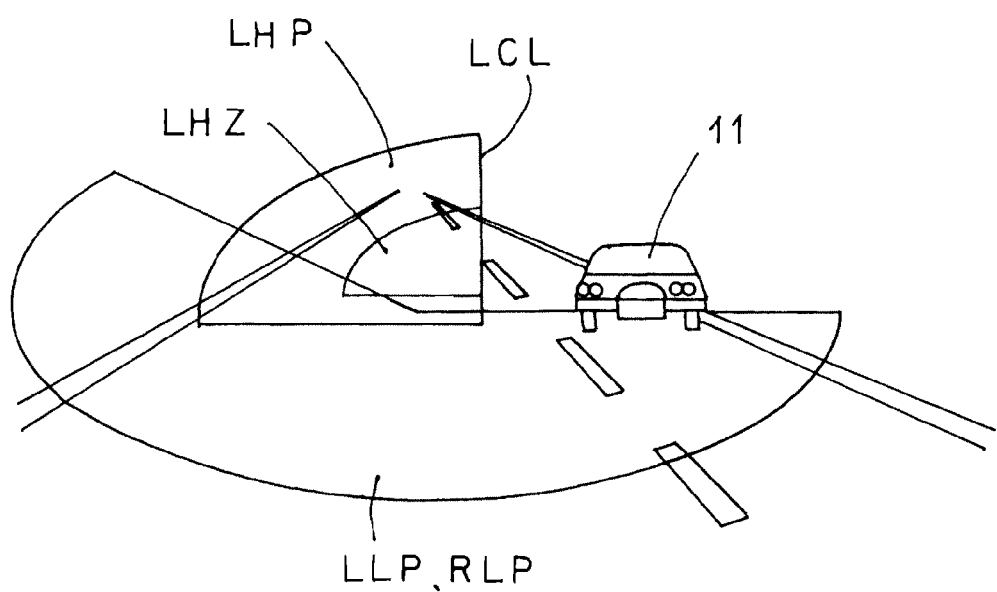
FIG. 17 is an explanatory view showing a road condition (a vehicle driving condition) that is established when the light distribution patterns for low beams on the left and right sides and light distribution patterns for high beams, a respective one of which is compatible with the light distribution pattern for shoulder edge beam on the left side are emitted forward of the vehicle.

The vehicle headlamps in the second embodiment are respectively capable of achieving functions and advantageous effects that are substantially identical to those of the vehicle headlamps 1L and 1R in the first embodiment. In particular, a respective one of the vehicle headlamps according to the second embodiment is provided in such a manner that the lamp unit 3 for high beam is configured so as to be rotatable around the vertical axis V-V by means of the swivel device 91, whereas the lamp unit 2 for low beam is fixed to its corresponding mount member. Thus, as shown in FIG. 15 to FIG. 17, the light distribution patterns LHP and RHP for high beams that are compatible with the light distribution patterns for shoulder edge beams on both of the left and right sides are distributed in a horizontal direction (a transverse direction), whereas the light distribution patterns for low beams LLP and RLP on both of the left and right sides are established in a fixed state. In this manner, there will be unlikely to occur a deformation that may be exerted by a distribution in the horizontal direction of the light distribution patterns for low beams LLP and RLP on both of the left and right sides, and its related visual recognition property is improved.

Description of Third Embodiment

Figure 18:
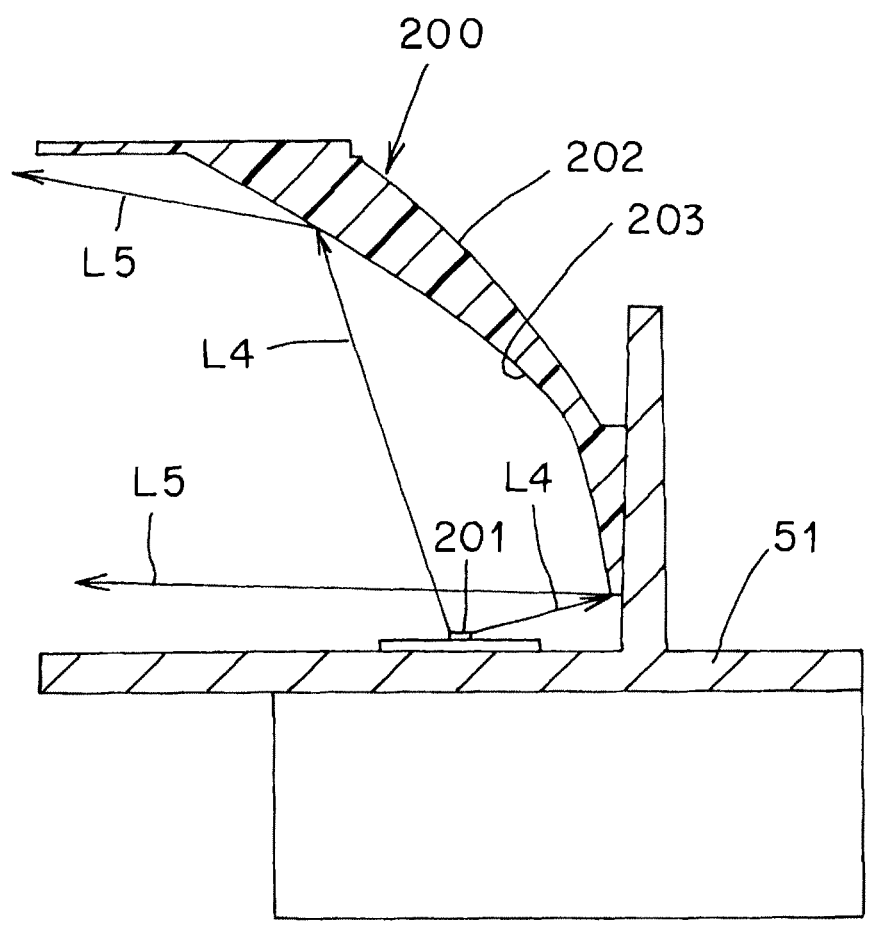
FIG. 18 is a vertical sectional view (a longitudinal sectional view and a sectional view that corresponds to FIG. 4) of a lamp unit for low beam showing a third embodiment of a vehicle headlamp system according to the present invention.

FIG. 18 shows a third embodiment of the vehicle headlamps according to the present invention. Hereinafter, the vehicle headlamps in the third embodiment will be described. In the figure, like constituent elements in FIG. 1 to FIG. 17 are designated by like reference numerals.

The vehicle headlamps 1L and 1R according to the first and second embodiments, as shown in FIG. 4, use lamp units (the lamp units 2 for low beams on both of the left and right sides and the lamp units 3 for high beams on both of the left and right sides), a respective one of which is made of: a semiconductor-type light source 20; and a reflector 23 that has a first reflection surface 21 and a second reflection surface 22. On the other hand, the vehicle headlamps according to the third embodiment, as shown in FIG. 18, use lamp units (the lamp units 200 for low beams on both of the left and right sides and the lamp units for high beams on both of the left and right sides), a respective one of which is made of a semiconductor-type light source 201 and a reflector 202 that has a reflection surface 203. The reflection surface 203 is configured to reflect light L4 from the semiconductor-type light source 201 and then by means of the reflected light L5, form predetermined light distribution patterns (the light distribution patterns for low beams LLP and RLP on both of the left and right sides and the light distribution patterns for high beams LHP and RHP that are compatible with the light distribution patterns for shoulder edge beams on both of the left and right sides).

The vehicle headlamps in the third embodiment are capable of achieving functions and advantageous effects that are substantially identical to those of the vehicle headlamps 1L and 1R in the first and second embodiments described previously. In particular, the vehicle headlamps of the third embodiment respectively are small in size in comparison with the vehicle headlamps 1L and 1R in the first and second embodiments described previously; and therefore, the vehicle headlamps are suitable in a case where they are installed in a small space.

Description of Examples Other than First, Second and Third Embodiments

The first second and third embodiments have described the vehicle headlamps 1L and 1R in a case where the vehicle C is configured to travel on the left side. However, the present invention can also be applied to a vehicle headlamp in a case where the vehicle C is configured to travel on the right side.

In addition, in the first, second and third embodiments, when the swivel device 91 is established in an inactive state at an initial state, as shown in FIG. 9 and FIG. 10, there can be obtained the light distribution patterns for low beams on both of the left and right sides that overlap each other, and as shown in FIG. 10, there can be obtained the light distribution patterns for high beams LHP and RHP that are compatible with the light distribution patterns for shoulder edge beams on both of the left and right sides on which the portions of the vertical cutoff lines LCP and RCL overlap each other. However, in the present invention, there will be no limitation in particular as to the light distribution patterns for low beams LLP and RLP on both of the left and right sides when a respective one of the swivel devices 91 is established in an inactive state at an in initial position; and the light distribution patterns for high beams LHP and RHP that are compatible with the light distribution patterns for shoulder edge beams on both of the left and right sides.

Still furthermore, in the first, second and third embodiments, the light distribution patterns for low beam LLP and RLP on both of the left and right sides, the light distribution patterns for high beam LHP and RHP that are compatible with the light distribution patterns for shoulder edge beam on both of the left and right sides are controlled so as to be dimmed by means of the dimming control portion of the control portion 90. However, in the present invention, there may be a configuration in such a manner that an arbitrary light distribution pattern only is controlled so as to be dimmed from among the light distribution patterns for low beam LLP and RLP on both of the left and right sides, the light distribution patterns for high beam LHP and RHP that are compatible with the light distribution patterns for shoulder edge beam on both of the left and right sides without a need to control other light distributions to be dimmed, or alternatively, there may be a configuration in such a manner that there is no need to control dimming of all of the light distribution patterns.

What is claimed is:

1. A vehicle headlamp comprising:
    a lamp unit for low beam configured to emit forward of a vehicle a light distribution pattern for low beam;
    a lamp unit for high beam configured to emit forward of the vehicle a light distribution pattern for high beam that is compatible with a light distribution pattern for shoulder edge beam; and
    a swivel device configured to rotate around a vertical axis of the lamp unit for low beam,
    wherein each of the lamp unit for low beam and the lamp unit for high beam comprises a respective semiconductor-type light source and a reflector configured to emit light from the semiconductor-type light source forward of the vehicle, wherein the lamp unit for high beam is integrally configured with, and adjacent to, the lamp unit for low beam so as to be rotatable around the vertical axis by means of the swivel device, the lamp unit for low beam configured to provide only the fight distribution pattern for low beam, and the lamp unit for high beam configured to provide only the light distribution pattern for high beam and the light distribution pattern for shoulder edge beam, wherein the vertical axis of the swivel device passes through a center or a substantial center of the lamp unit for low beam.

2. A vehicle headlamp device comprising:
    the vehicle headlamp according to claim 1;
    a detecting portion configured to detect whether or not a preceding vehicle or an opposite vehicle forward of a driving vehicle exists; and
    a control portion configured to output a control to the semiconductor-type light source and the swivel device, based on a detection signal from the detecting portion.

* * * * *